United States Patent [19]
Cox

[11] 3,748,811
[45] July 31, 1973

[54] PACKAGING METHOD AND MACHINE
[75] Inventor: Thomas L. Cox, Beaumont, Tex.
[73] Assignee: J. & J. Manufacturing Company, Beaumont, Tex.
[22] Filed: Nov. 4, 1971
[21] Appl. No.: 195,589

[52] U.S. Cl.................... 53/28, 53/182, 156/311, 156/498, 219/243
[51] Int. Cl........................ B65b 9/02, B65b 51/08
[58] Field of Search ................. 53/28, 39, 180, 182, 53/373; 156/311, 498; 219/243

[56] References Cited
UNITED STATES PATENTS

| | | | |
|---|---|---|---|
| 2,621,704 | 12/1952 | Langer | 219/243 X |
| 2,931,148 | 4/1960 | Smith | 53/182 X |
| 3,158,973 | 12/1964 | Monaghan | 53/182 X |
| 3,173,554 | 3/1965 | Ebbert | 198/27 X |
| 3,191,356 | 6/1965 | Zelnick et al. | 53/182 |
| 3,473,288 | 10/1969 | Nakamura et al. | 53/182 X |
| 3,490,194 | 1/1970 | Monaghan | 53/182 X |
| 3,548,140 | 12/1970 | Oneill | 53/39 X |

Primary Examiner—Robert L. Spruill
Attorney—Tom Arnold, James L. Jackson et al.

[57] ABSTRACT

A packaging machine for producing a loosely wrapped package containing a manufactured article, such as a bale of tacky polymer. The product is positioned by the machine between sheets of thermoplastic material that are heat-sealed in spaced relation about the periphery of the product to form a loose envelope about the article. The packaging machine employs a heat-sealing mechanism heated by electrical resistance to seal the downstream end the upstream end of a package and to seal the downstream end of an immediately following package in a single operation. Subsequent to, or simultaneously with, the sealing operation a cutting mechanism also heated by electrical resistance severs the completed package from the sheets of plastic material, and the machine ejects the completed package immediately following the sealing and severing operation. The sealing mechanism of the machine employs tubular sealing elements that are heated by electrical resistance and cooled by circulation of a coolant such as water therethrough. A gas such as air is injected into the sealing elements to eject the coolant therefrom immediately preceding a subsequent heating cycle in order to facilitate rapid heating of the sealing elements.

13 Claims, 13 Drawing Figures

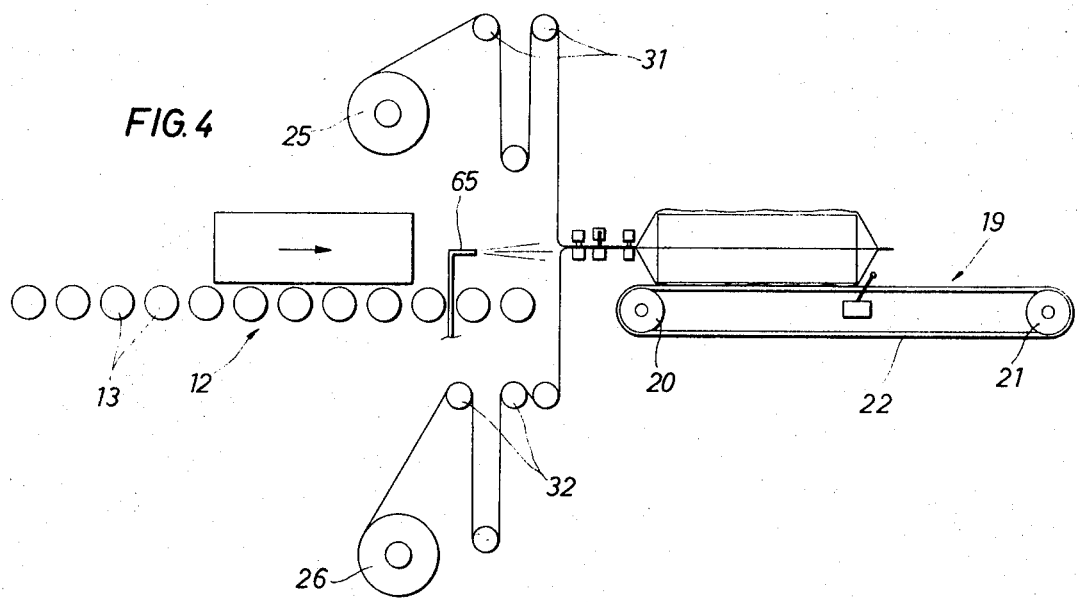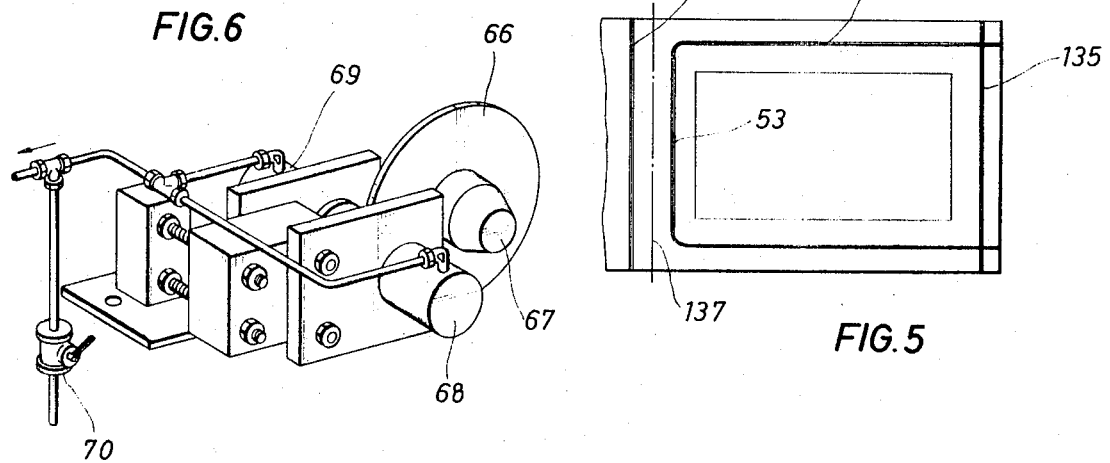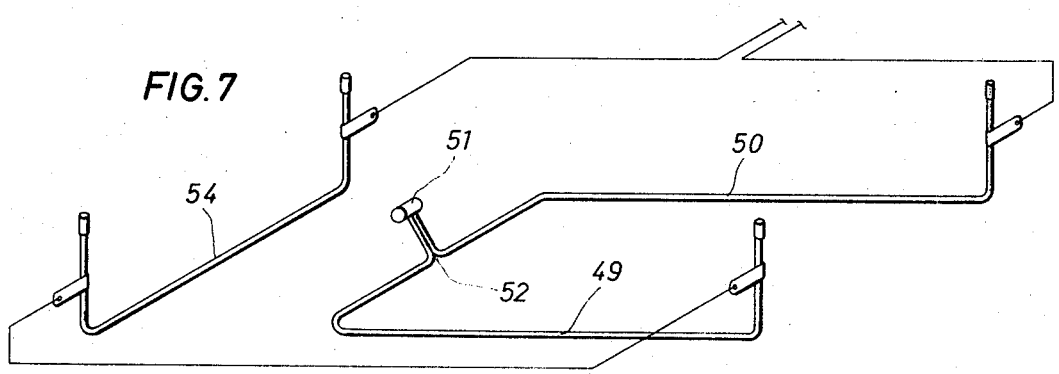

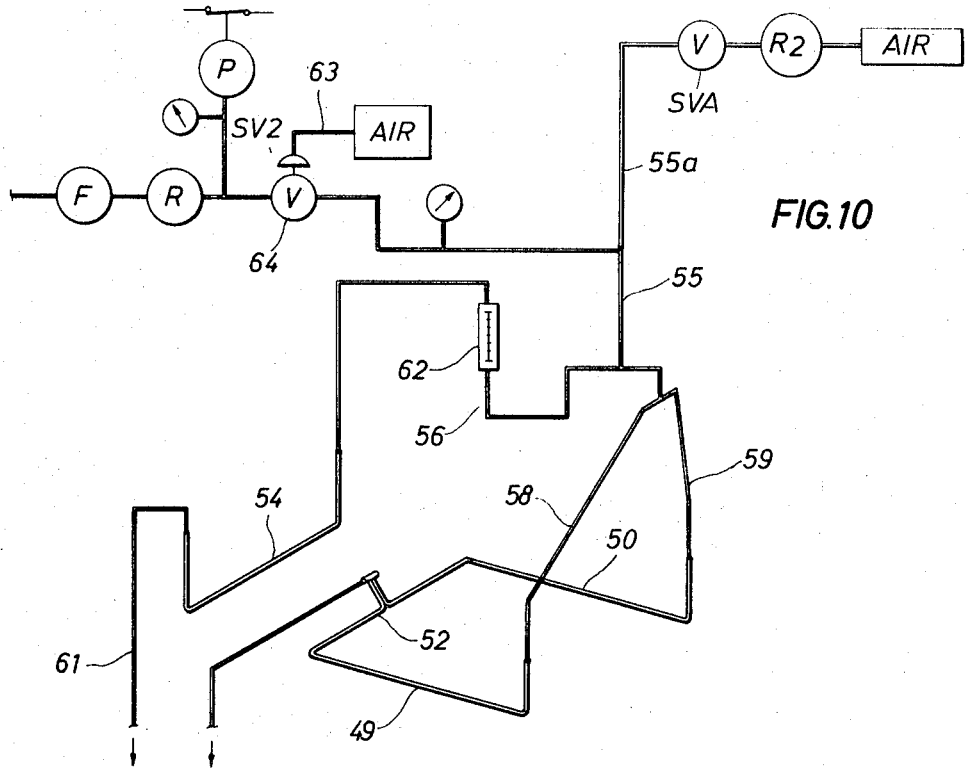
FIG.10
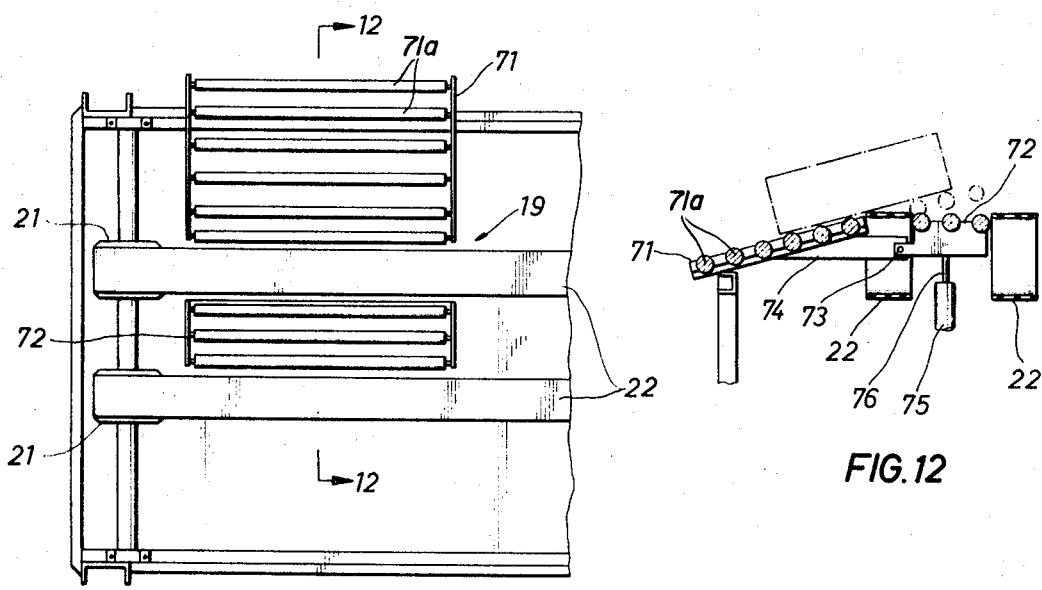
FIG.11
FIG.12

PACKAGING METHOD AND MACHINE

FIELD OF THE INVENTION

This invention relates generally to the packaging of manufactured articles and more particularly to the packaging of bales of a tacky polymer, having a characteristic of cold-flowing in a relatively short period of time. The invention specifically relates to a packaging machine having a capability of forming a package from sheets of thermoplastic material and severing the formed package from the sheets of thermoplastic material and immediately ejecting the finished package from the packaging machine to allow the packaged bales to be placed into containers or stacked onto pallets before sufficient time lapses for the bales to deform by cold-flowing.

BACKGROUND OF THE INVENTION

In the synthetic rubber industry, the semi-finished product of tacky material has the characteristic of cold-flowing within a short period of time. For example, in the manufacture of synthetic rubber, a manufacturing facility may produce bales of raw or uncured synthetic rubber, which must be stored for a particular period of time until subsequently needed for use in the manufacture of finished synthetic rubber articles such as tires. The bales of synthetic rubber may be shipped from a manufacturing facility having partial product processing capability to another manufacturing facility having a capability of further processing the raw rubber bales into a finished synthetic rubber product. Because of the characteristic of the tacky bales of synthetic rubber to adhere to one another into a more or less solid mass, it is necessary to package the bales individually in a film of material such as polyethylene in order to allow the bales to be separated and used individually as needed for the final manufacturing process. For storage purposes, it is typical to stack the packaged bales of synthetic rubber within a carton that is particularly designed to enclose a stack containing perhaps 20 or 30 packaged bales. The carton contains the cold-flowable material and prevents undue distortion of the material until it is to be used.

The provision of a loose package is necessary to allow some degree of movement of the cold-flowing material without risking rupture of the packages. It is also desirable to provide a vent in the package to allow trapped air to escape if necessary but care must be taken to insure that the cold-flowable polymer does not extrude through the vent to an unacceptable degree.

Apparatus is presently commercially available for packaging bales of tacky polymer in loose envelopes that are prepared by heat-sealing sheets of thermoplastic material about the bales. Such machines typically function in response to the presence of an unwrapped bale of tacky polymer, which, in being conveyed through the packaging machine, engages appropriate limit switches or other control devices to initiate and control the bale packaging process. Such machines, for example, as set forth by U. S. Pat. No. 2,931,148, accomplish severing immediately downstream of a bale being packaged. This arrangement causes the last bale being packaged to remain in the packaging machine, and if left for a period of time the packaged bale will deform by cold-flowing to the extent that stacking and containerizing the bales would be difficult if not impossible. Bales that cannot be properly stacked are typically discarded which, of course, is costly. Frequently, extraction of the last remaining bale from a packaging machine must be accomplished manually when the machine does not have the capability of ejecting the bales immediately following the bale package sealing operation.

During heat-sealing of the package in which the bale is contained, it is typically the practice, as set forth in U. S. Pat. No. 2,931,148, to provide a coolant fluid, such as water, that is circulated through tubular heating elements immediately following the sealing operation in order to cool the heating elements quickly, thereby shortening the sealing cycle and facilitating a better production rate for the machine. Subsequent to the heating cycle, however, coolant will remain within the tubular heating element and will retard subsequent heating of the heating element, which not only interferes with the production rate of the machine but also causes build-up of scale and other deposits within the tubular heating element, due to boiling of the coolant fluid as the heating element is heated.

It is, therefore, a primary object of the present invention to provide a novel packaging machine that is capable of producing loosely wrapped packages of a manufactured article and immediately ejecting the finished package from the machine to prevent cold-flowing of the packaged manufactured article within the packaging machine.

It is another object of this invention to provide a novel packaging machine that is capable of selectively ejecting completed packages linearly from the machine or in transverse relation to linear movement of packages through the machine.

It is an even further object of the present invention to provide a novel packaging machine that employs a coolant fluid that is circulated through tubular heating elements to shorten cooling of the heating elements subsequent to a sealing operation, thereby enhancing the production rate of the machine.

Among the several objects of the present invention is noted the contemplation of a novel packaging machine that employs a gas such as air to eject coolant fluid from the heating elements subsequent to a cooling operation, to facilitate rapid heating of the heating element during a subsequent heating cycle and to prevent rapid build-up of scale or other deposits within the heating element.

It is an even further object of the present invention to provide a novel packaging machine that employs timed heating and cooling cycles, including coolant valve controls for optimum rapid control of the heating and sealing cycles, to enhance the production rate of the machine.

SUMMARY OF THE INVENTION

The invention concerns a packaging machine for producing a loosely wrapped package of a manufactured product, such as a bale of tacky polymer having cold-flowing characteristics. The envelope comprising the package is produced from sheets of thermoplastic materials, such a polyethylene, which may extend from rolls of sheet material rotatably supported by the machine structure.

The packaging machine generally comprises a framework defining a sealing station and having a conveyor that is supported by the framework and is operative to position a bale of tacky polymer between the sheets of thermoplastic material. Opposed backing and sealing elements are carried by the framework adjacent the sealing station and are moveable, one relative to the other, into compressive engagement with the sheets of thermoplastic material about the periphery of a bale positioned at the sealing station.

The heat sealing mechanism of the packaging machine includes a generally "U"-shaped sealing element, capable of sealing the upstream end and two sides of the package to be formed, and a straight transverse heating element capable of sealing the downstream end of an immediately succeeding package. The heating elements are tubular and are connected to a valve controlled system for injecting a coolant fluid such as water into the tubular heating elements for selectively cooling the same immediately after heating, thereby cooling the fused seal and enhancing the production rate of the machine.

The sealing elements also include structure for injection of a gas into the heating elements for the purpose of selectively ejecting the coolant fluid therefrom immediately following a cooling cycle in order to dispose the heating elements in condition for rapid heating during a succeeding sealing cycle. The packaging machine also includes a severing mechanism in the form of a wire-like cutter that is heated and is operative to sever a completed package from the sheets of thermoplastic material immediately upstream of the seal at the upstream end of the package, thereby allowing the package to be free for immediate ejection from the packaging machine.

The machine also includes a second conveyor that is supported by the framework and is operative to eject a completed package linearly or transversely from the machine immediately following a sealing and severing cycle.

BRIEF DESCRIPTION OF THE DRAWINGS

So that the manner in which the above-recited features, advantages and objects of the present invention, as well as others which will become apparent, are attained and can be understood in detail, more particular description of the invention, briefly summarized above, may be had by reference to the embodiment thereof which is illustrated in the appended drawings, which drawings form a part of this specification.

It is to be noted, however, that the appended drawings illustrate only a typical embodiment of the invention and are, therefore, not to be considered limiting of its scope, for the invention may admit to other equally effective embodiments.

Figures 1, 2:
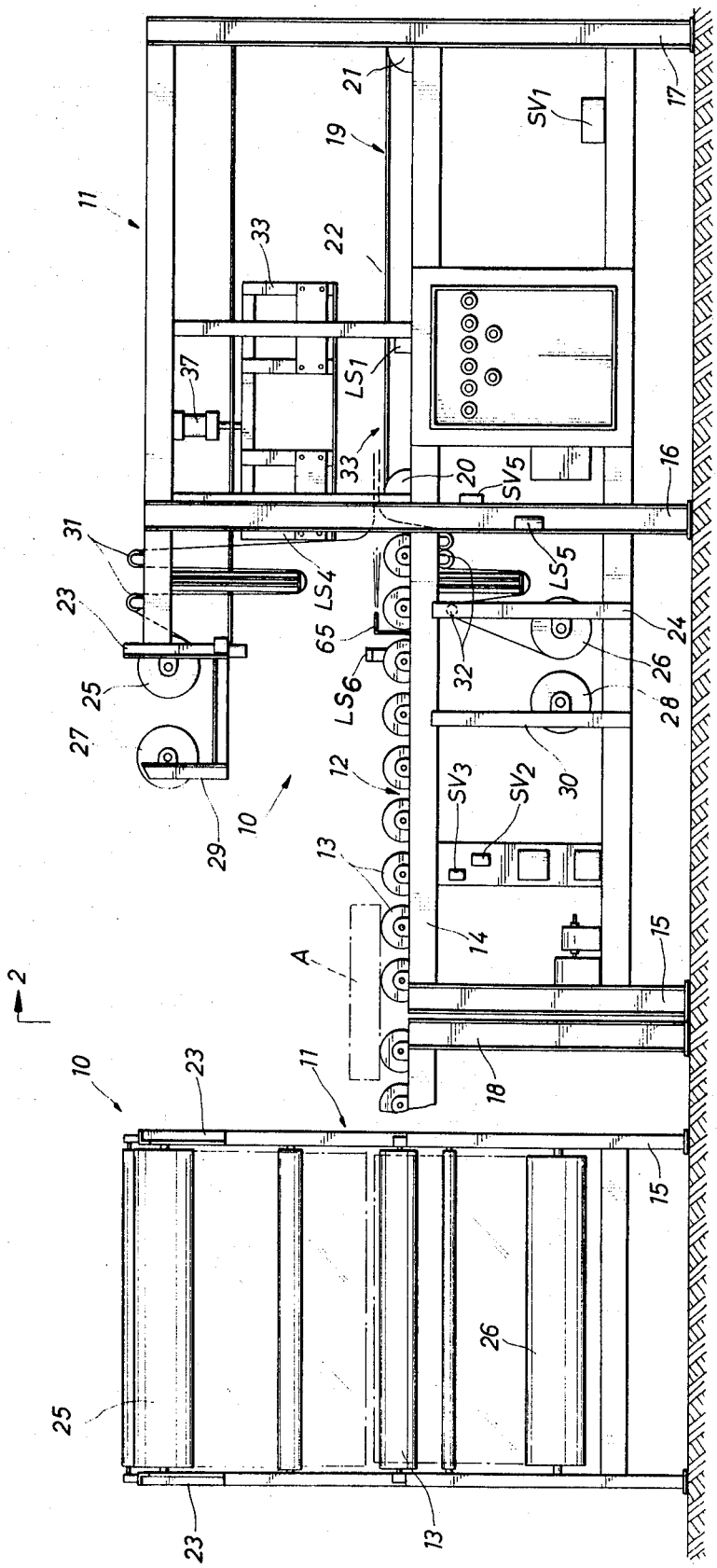

IN THE DRAWINGS:

FIG. 1 is a side elevational view of a packaging machine constructed in accordance with the present invention.

FIG. 2 is an end elevational view taken along line 2—2 in FIG. 1.

Figure 3:
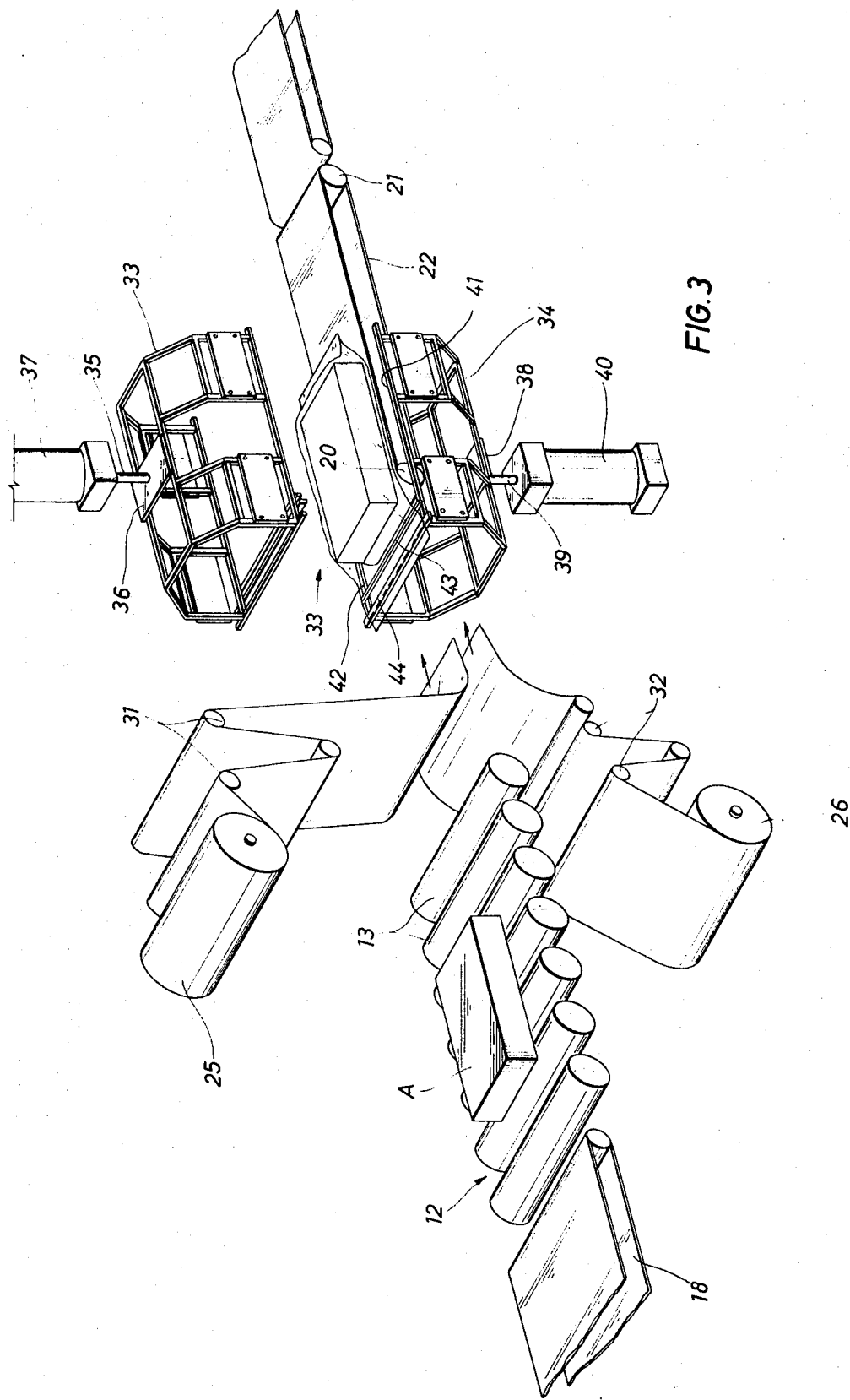

FIG. 3 is an isometric view in simplified form of the sheet feeding mechanism, the conveyor mechanism and the heat-sealing mechanism of the packaging machine of FIG. 1, illustrating forming of a loose package about a generally rectangular article being conveyed through the machine.

FIG. 4 is a simplified side view of the sheet feeding, sealing and conveying mechanism of the machine of FIG. 1 illustrating packaging of a bale and severing of the bale adjacent its upstream extremity.

FIG. 5 is a plan view of a packaged bale as it appears in the machine immediately preceding the severing operation and illustrating the configuration of the heat seals developed in the sheet material by the sealing element.

FIG. 6 is an isometric view of one of the braking systems utilized in the machine of FIG. 1 to control rotation of the rolls of heat sealable sheet material.

FIG. 7 is an isometric view illustrating relative positioning of the heat sealing elements of the machine and schematically illustrating electrical circuitry for heating of the heat sealing elements.

Figure 8:
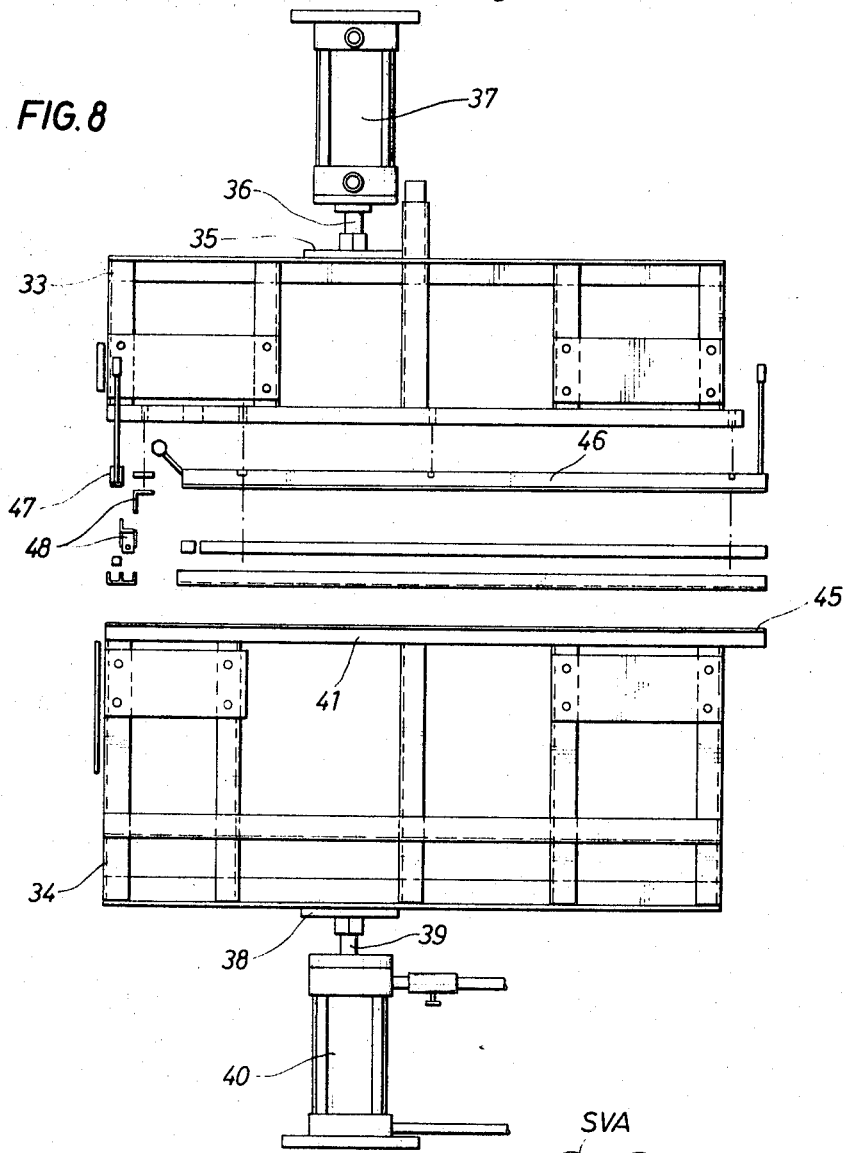

FIG. 8 is a side elevational view of the sealing and backing mechanism of the machine of FIG. 1, illustrating the sealing elements and the supporting structure therefor in exploded form for purpose of simplicity.

Figure 9:
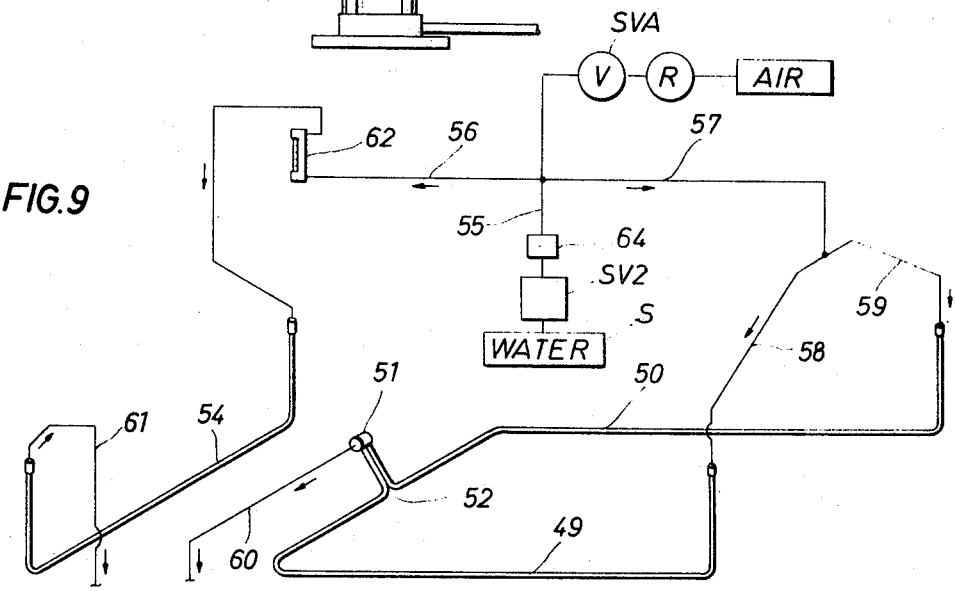

FIG. 9 is an isometric, partially schematic view, illustrating circulation of coolant fluid through the sealing element structures.

FIG. 10 is an isometric, partially schematic view of the sealing elements of the machine of FIG. 1, showing the gas purge system for the heating elements.

FIG. 11 is a plan view of the conveyor mechanism of the machine of FIG. 1, illustrating a side ejector mechanism that may be employed selectively to eject packaged articles in transverse relation to the flow of bales through the packaging machine.

FIG. 12 is a sectional view taken along line 12—12 in FIG. 11 and illustrating operation of the side ejector mechanism.

Figure 13:
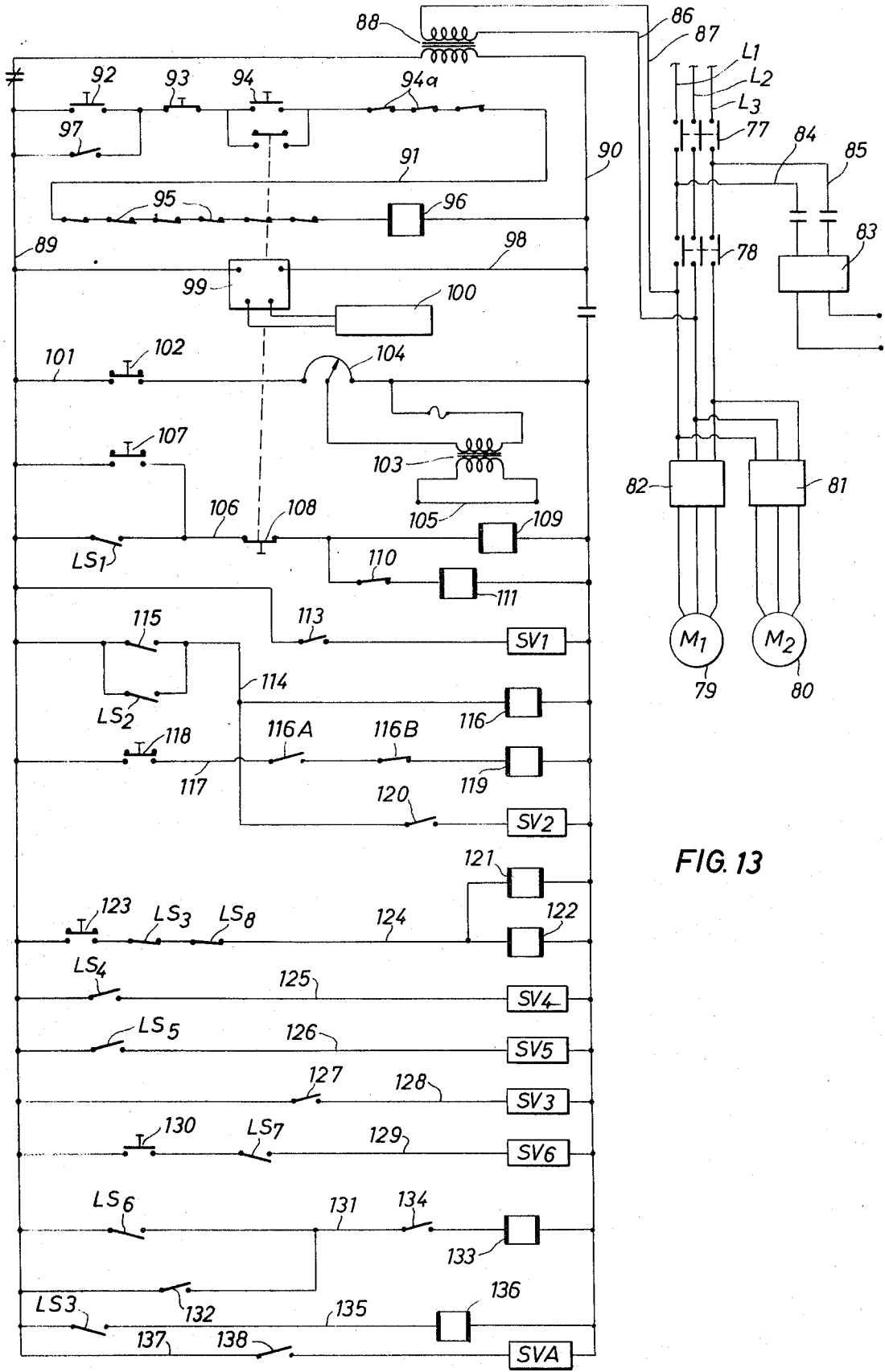

FIG. 13 is an electrical schematic circuit illustrating the electrical circuitry utilized for operation and control of the packaging machine.

DESCRIPTION OF PREFERRED EMBODIMENT

Now referring to the drawings and first to FIG. 1, there is illustrated generally at 10 a machine for packaging articles such as bales of uncured tacky polymer emerging from a bale forming press. The packaging machine may have a framework illustrated generally at 11, supporting the various mechanical devices from which the machine is composed. The machine includes an infeed conveyor, shown generally at 12, comprising a plurality of feed rolls 13, disposed in generally horizontal manner and journaled for rotation between generally parallel support beams 14 that are in turn supported by vertical columns 15, 16 and 17. The infeed conveyor 12, is disposed in alignment with a supply conveyor 18, capable of conveying bales from a processing facility to the packaging machine.

The packaging machine also includes an exit conveyor, illustrated generally at 19, comprising a pair of driven rolls 20 and 21, journaled for rotation between horizontal beams 14, and driving a pair of conveyor belts 22. The conveyor belts 22 are operative to receive bales from the infeed conveyor 12, to controllably convey bales to a sealing station and to eject packaged bales from the packaging machine in linear manner.

Generally, vertically disposed upper and lower pairs of supports, 23 and 24, respectively, form a part of the framework 11 and support upper and lower primary rolls 25 and 26 of thermoplastic sheet material from which the packages are formed. Upper and lower auxiliary rolls of thermoplastic sheet material 27 and 28, respectively, are journaled for rotation between pairs of upper and lower support members 29 and 30, respectively, which also form a part of the framework 11. Provision of the auxiliary rolls 27 and 28 effectively allows the packaging machine to be maintained in a state of substantially continuous operation even though plastic sheet film may become exhausted from the primary film supply rolls.

Upper and lower sets of idler rollers 31 and 32, respectively, are journaled for rotation on the framework and provide cushioning loops of thermoplastic sheet material, which is withdrawn from the supply rolls and is moved as upper and lower webs to a sealing station, illustrated generally at 33. Each of the supply rolls is provided with a brake mechanism described in detail hereinbelow, that is employed to prevent overrunning of the supply rolls when the thermoplastic sheet material is stopped for a sealing operation.

The packaging machine of the present invention is provided with a mechanism for sealing the plastic material about a manufactured article such as a bale of tacky polymer, and according to the present invention, the sealing mechanism may conveniently take the form illustrated, particularly in FIGS. 3 and 8, where there is shown an upper sealing frame 33 and a lower backing frame 34, between which is disposed the sealing station 33a. The sealing frame 33 may include a support plate 35 to which the framework is connected and which is in turn connected to the operating shaft 36 of a linear fluid motor 37. The fluid motor 37 may be secured to the framework of the packaging machine as illustrated in FIG. 1. The lower backing frame 34 is also provided with a support plate 38 to which the framework is secured and to which is affixed the operating shaft 39 of a fluid motor 40 secured to the framework of the packaging machine in any desirable manner.

At the upper extremity of the backing frame 34 is disposed a pair of generally parallel backing members 41 and 42 disposed in intersecting relation with transverse backing members 43 and 44. The upper surfaces of each of the backing members may be coated or lined with a resilient material 45 that is also resistant to the degree of heat that is necessary to cause fusing of sheets of plastic film.

The upper sealing frame may be provided with a detachable generally U-shaped sealing element support section 46 that may be secured to the upper sealing frame 33 by bolt members or any other suitable means of connection. A transverse heating element section 47 may also be secured to the sealing frame in any suitable manner in spaced relation from the U-shaped sealing element support 46. It is apparent that the sealing frame and backing frame, when brought together into compressive engagement with sheets of thermoplastic film therebetween, will, upon sufficient heating of the heating elements, produce a U-shaped seal about two sides and the upstream extremity of a package being formed and will simultaneously form a spaced transverse seal defining the downstream extremity of the immediately succeeding package to be formed. This feature may be more evident when considered with reference to FIG. 7.

Between the U-shaped sealing element 46 and the transverse sealing element 47 may be disposed a film severing device 48 which supports a conventional wire-like severing element that is heated by electrical resistance and is operative to sever the thermoplastic films between the upstream extremity of the package being formed and the downstream extremity of the next succeeding package. With reference now to FIGS. 7, 8 and 9 the heating elements are shown to include electrical circuitry for resistance heating, a coolant circuit for selectively cooling the heating elements and a gas purge system for ejecting coolant from the heating element immediately preceding a sealing cycle. With respect to FIG. 7 the U-shaped heating element is shown to comprise a pair of heating element sections 49 and 50 that are secured together by a manifold section 51 and are so configured to define a discontinuity shown at 52 that causes a break or space 53 to occur in the U-shaped seal being defined in the plastic film material. The break or space 53 defines a vent that allows entrapped air to become displaced from the plastic envelope as the bale of tacky polymer cold-flows after the bale has been packaged. This feature prevents the package from becoming ruptured and yet provides loose plastic material on either side of the vent that will contain any of the tacky polymer that might be extruded through the vent by cold-flowing 53. As illustrated in FIG. 7, the U-shaped sealing element and the transverse sealing element 54 are electrically connected in series in order that they may be heated simultaneously.

The sealing mechanism of the present invention may include a cooling system for cooling the heating elements for the purpose of accelerating the formation of a seal and thereby accelerating the production cycle of the machine. According to the present invention, such cooling system may conveniently take the form illustrated in FIG. 9 where a coolant fluid, such as water, may be supplied from a coolant supply S through a supply conduit 55 connected to branch conduits 56 and 57 that conduct the coolant fluid to the U-shaped cooling element and the transverse sealing element, respectively. In order to facilitate rapid cooling of the U-shaped heating element, the conduit 57 is connected to conduits 58 and 59 conducting the coolant fluid to the tubular heating element sections 49 and 50, respectively. Coolant fluid, after passing through the heating element sections 49 and 50, flows into the manifold section 51 and then into a discharge conduit which conducts the used coolant fluid to a disposal or recirculating facility, not shown. Likewise, coolant flowing from the branch conduit 56 through the tubular transverse heating element 54 is conducted into a discharge conduit 61 for disposal. A rotometer 62 may be connected into the branch conduit 56 for the purpose of visually identifying the flow of coolant fluid or gas through the branch conduit.

With reference now to FIG. 10, a combination purge gas supply and water supply system may be employed to materially reduce the heating and cooling cycles and enhance the production rate of the packaging machine. The conduit structure differs from the conduit structure set forth in FIG. 9, in the provision of a control gas supply identified as AIR, which may be conducted by a control gas supply conduit 63 for actuation of a water supply valve 64 actuated by a pilot SV-2.

Although air will ordinarily be employed as a coolant ejection medium, it is not intended to limit the invention solely to this particular medium. The coolant supply conduit 55 may include a filter F and a regulator R for the purpose of controlling the supply of coolant fluid into the coolant system and may also employ a pressure switch P that may be operative to deenergize the machine in the event low pressures are encountered such as might occur if a sealing element should burn out causing leakage of coolant therefrom.

The coolant supply may also be disposed in communication with a gas purge circuit including a conduit 55a having a gas control valve SVA that automatically purges water from the sealing elements responsive to injection of a gas such as pressurized air from a source AIR into the air purge conduit 55a under pressure regulated by a regulator $R_2$.

When packages are produced from sheets of thermoplastic material, the free extremity of the sheets may become so positioned by overrunning of the sheet supply rolls so as to interfere with proper positioning of a bale or other article relative to the sheets at the beginning of a packaging cycle. When this occurs, frequently the downstream seal of the package to be developed will become broken and it will be impossible to develop a properly sealed package. According to the present invention, a means for preventing interference by the sheet material with the bale being positioned at the sealing station of a packaging machine may conveniently take the form illustrated in FIGS. 1 and 4 where one or more gas jets 65 may be positioned to impinge jets of air or other suitable gas on the free extremities of the material for the purpose of properly separating the sheets of material and allowing free entry therebetween of a bale to be packaged. Forces applied to the sheet material by the jets of compressed gas tend to assist in withdrawing sheet material from the rolls 25 and 26 thereby preventing the bale, being conveyed into sealing position, from exerting sufficient forces on the sheet material to rupture the downstream seal of the package. The jets 65 may be disposed at each side of the conveyor in such manner as to prevent interference with the bales being conveyed to the sealing station.

As indicated above, it is typical for a rotating roll of film material to overrun when the film has been stopped for a sealing operation. To prevent overrunning of the sheets of plastic film, a roll braking mechanism may be provided which, according to the present invention, may conveniently take the form illustrated in FIG. 6 where one extremity of the roll support is defined by a brake disc 66 that is affixed to a support cone 67 provided for supporting one extremity of the roll of sheet material. Brake cylinders 68 and 69 may be mounted adjacent the brake disc 66 and may be operative to actuate brake plungers into braking engagement with the disc 66 upon being energized through an air supply system responsive to a solenoid valve 70. Each of the rolls of sheet material may be provided with similar automatically actuated disc brake systems to prevent overrunning. The solenoid control valve may be actuated in response to actuation of a limit switch by the article being conveyed in order to provide for braking at the proper time during the packaging operation.

While the packaging machine may be typically provided with a linear bale ejection conveyor, illustrated generally at 19 in FIG. 1, it may be appropriate to provide a mechanism for selectively ejecting bales transversely from the packaging machine in the event such should become necessary or desirable. According to the present invention, such side ejecting mechanism may conveniently take the form illustrated in FIGS. 11 and 12 where a side ejection conveyor 71, including freely rotatable rolls 71a, is shown to be disposed in angular relationship to a plane defined by conveyor belts 22 to allow conveyance of packaged bales by gravity.

Between the conveyor belts 22 may be disposed a bale lifting conveyor 72 also including freely rotatable rolls that may be pivotally connected at 73 to a support 74 forming a part of the frame-work of the packaging machine. A fluid motor 75 may be provided with an operating shaft 76 connected to the conveyor 72 and may be operative to move the conveyor 72 about its pivot 73 thereby aligning the rolls of the lifting conveyor with the angularly disposed rolls of the side ejecting conveyor 71. It will be apparent that upon energization of the fluid motor 75 the operating shaft 76 will pivot the bale lifting conveyor 72 thereby causing the bales to move by gravity downwardly to be ejected by the side ejection conveyor 71. The fluid motor 75 may be actuated manually to achieve ejection of a selected bale or, if desired, may be actuated selectively and automatically by a bale moving into engagement with an appropriate limit switch during conveyance thereof by the conveyor belts 22.

With reference now to FIG. 13, there is illustrated a schematic electrical circuit that may be utilized for operation and control of the packaging machine of the present invention. Electrical power for operating the packaging machine is supplied by conductors L1, L2, and L3 through overload switches 77 and 78 to energize conveyor drive motors 79 and 80 through any suitable motor control circuitry 81 and 82. Electrical power for heating the sealing elements and the severing element may be supplied to heating control circuitry 83 by conductors 84 and 85 connected respectively to conductors L1 and L3. Electrical supply conductors 86 and 87 may be connected to conductors L1 and L2 for the purpose of supplying electrical energy to a transformer 88 having the secondary windings thereof connected across power supply busses 89 and 90. A primary control circuit 91 may be connected across the power supply busses 89 and 90 and may include a start switch 92, in the form of a conventional holding circuit, and a stop switch 93, connected in series with the holding circuit. The primary control circuit may also include a pressure switch 94, also defining a holding circuit, that may be operative to de-energize the primary control circuit in the event low fluid pressures are encountered during operation of the machine. The primary control circuit may also include suitable overload switches 94 and safety switches 95, each being normally closed and being moved to an open position deenergizing the primary control circuit in response to the development of an unsafe condition within the machine. A control relay 96 may be energized by the control circuit for the purpose of closing a control relay switch 97 of the holding circuit and maintaining the control circuit in energized condition upon movement of the start switch back to its normally open position.

The electrical circuitry of the packaging machine may also include a thermister circuit 98 including a thermister 99 responsive to a probe 100 for the purpose of monitoring the heat in the sealing elements. If the elements should become overheated the thermister will deenergize the machine.

A cutter wire circuit 101 may also be provided and be selectively controlled by a switch 102 for energizing a cutter wire transformer 103 that may be adjusted as desired by a rheostat 104 for controlling the temperature of the cutter wire 105 which is heated.

A sealing circuit 106 may be energized by a manually closed switch 107 which through switch 108 is maintained in closed position by the pressure switch 94 thereby energizing a time delay relay 109 which is operative to close a relay switch 110 that in turn closes to energize a relay 111 maintaining energization of the circuit 106 through a limit switch LS1. The limit switch LS1 is engaged and actuated by a package reaching the sealing position at the sealing station of the machine and has the function of stopping the infeed conveyor 12 and the exit conveyor 19 with the bale positioned at the sealing station 33 within the machine. With the bale so positioned at the sealing station, limit switch LS1 will be closed and the energized relay 111 will actuate a relay switch 113 to the closed position thereof, energizing solenoid valve SV1 which opens to initiate the supply of pressurized gas to energize the fluid motors 37 and 40. A timing circuit 114 may be energized either by closure of a relay switch 115, actuated by the relay 109, or by closure of a limit switch LS2 to control energization of a time delay relay 116 having the function of delaying closure of the switch 115 for a particular period of time necessary for fusing of the thermoplastic sheet material.

A heat contactor circuit 117 may be energized through closure of a heat contactor switch 118 to energize a heat contactor relay 119 by closure of a relay switch 116A and a time delay switch 116B that in turn closes a switch 120 and thereby actuates a solenoid valve SV2. The solenoid valve SV2 has the function of controlling the flow of coolant through the heating elements of the packaging machine for cooling at the termination of the heating cycle.

Entrance and exit conveyor motor starters 121 and 122 respectively, may be energized upon closure of a control switch 123 which energizes the relay circuit 124 through normally closed limit switches LS3 and LS8. Normally, open limit switches LS4 and LS5 are closed by contact with a bale passing through the packaging machine, and are operative to control energization of film brake circuits 125 and 126 through which solenoid valves SV4 and SV5 are operative to actuate the brake mechanism illustrated in FIG. 6.

The air jet mechanism 65 functions upon opening of a solenoid valve SV3 that is energized by a relay switch 127 actuated in turn by relay 133 to energize the air jet circuit 128. A bale ejector circuit 129 is energized through a bale ejector switch 130 and a limit switch LS7, but is closed upon engagement with a bale being properly positioned on the exit conveyor. The air jet circuit 131 is energized through a limit switch LS6 maintained in energized condition by a relay switch 132 which is energized upon actuation of an air jet relay 133. A time delay relay switch 134 energized by relay 116 is provided for timed operation of the air jet system.

An air purge circuit 135 is energized through limit switch LS3 which actuates a time delay relay 136. A circuit 137 is a timed circuit energized through a time delay switch 138 actuated through time delay relay 136, which in turn actuates solenoid valve SVA. Solenoid valve SVA opens to allow the pressurized air or other suitable gas to eject the coolant fluid from the sealing elements.

Referring now to FIG. 1, a bale A may be fed from the supply conveyor 18 onto the feed rolls 13 of the infeed conveyor 12 until it contacts the first limit switch LS6. The limit switch LS6 energizes the circuits 131 and 128 and causes opening of the solenoid valves SV3 which initiates jets of compressed gas, such as compressed air, from the jets 65. The jets blow a stream of air against the top and bottom sheets of thermoplastic film thereby forcing the plastic film into proper position for receiving the bale to be packaged.

It should be borne in mind that, upon packaging the previous bale, a downstream seal 135 was formed to define the downstream extremity of a following package as shown in FIG. 5. The jets of air or other compressed gas impinge upon the film sheets and cause the film sheets to move downstream to reduce the force of contact of the moving bale against the film sheets thereby preventing rupture of the downstream seal and holding the thermoplastic film sheets in proper position for forming effective side seals.

The bale is moved along the infeed conveyor and becomes contained between the sheets of thermoplastic material. The flow of air through the air jets will keep the top film layer open during this phase. When the bale is moved into contact with limit switch LS1, a relay 111 is activated which energizes the fluid motors 37 and 40 causing the upper sealing frame 33 and the lower backing frame 34 to move into position encompassing the bale to be sealed and compressing the upper and lower sheets together. The relay 111 is also operative to stop both the infeed and exit conveyors. As the sealing and backing frames move into engagement a limit switch LS3 is released thereby moving to its normally open position to insure that the infeed and exit conveyors will not be capable of functioning until such time as the sealing and backing frames again reach their retracted positions. As the sealing and backing frames move together, a limit switch LS2 is activated which initiates the sealing cycle and stops the flow of air through the air jets in response to actuation of time delay relay switch 134. The seal is formed, as indicated above, by a generally U-shaped sealing element which forms a generally U-shaped seal 136 as illustrated in FIG. 5 which is separated at the upstream extremity thereof as illustrated at 53 in FIG. 5 by a seal discontinuity to define a vent aperture. Simultaneously, a seal 135 is formed defining the downstream extremity of the immediately succeeding envelope as shown in FIG. 5.

Immediately following the sealing operation, or simultaneously therewith, the completed bale is severed from the sheets of thermoplastic material by a cutting mechanism in the form of a heated stainless steel cutter wire by making a transverse cut between the upstream end of a sealed package and the downstream seal of the immediately succeeding package, as illustrated at 137 in FIG. 5. It is appropriate to sever the completed bale package from the thermoplastic sheet material during the sealing cycle while the sealing frame is disposed in compressive engagement with the backing frame.

The sealing cycle is a timed cycle, the timing of which being controlled by time delay relays in the electrical circuitry. At the end of a timed sealing cycle, the cooling cycle is activated whereupon appropriate circuitry is energized to open a coolant control solenoid valve and allow the flow of water or other acceptable coolant through the tubular sealing element in the manner illustrated in FIG. 9. Coolant flows through the sealing elements to cool them and thereby rapidly cure the envelope seal developed by the sealing element. The cooling cycle is also a timed cycle which, when terminated, stops the flow of coolant through the sealing element and causes the sealing frame and backing frame to be retracted by the fluid motors 37 and 40 which function in response to opening of solenoid valve SV1. As the sealing frame and backing frame reach the retracted position, a limit switch LS3 is engaged by the sealing frame which closes to allow energization of the conveyor circuit 124. If for any reason a succeeding bale is not present on the infeed conveyor 12, such as might occur during temporary interruption or ceasing of production, the envelope containing bale will be conveyed out of the machine and the conveyors will continue to run. The packaging machine thereby adapts itself to irregular production rates and eliminates the necessity for manually removing a packaged bale from the machine if discontinuity of production is expected for a time sufficient to allow cold-flowing of a packaged bale in the machine.

As the sealing and backing frames reach their retracted positions, the solenoid valve SVA will be opened in response to actuation of limit switch LS3 and appropriate circuitry thereby introducing compressed air or other suitable gas into the supply conduit 55 and branch conduit 56. The branch conduit conducts the pressurized air into conduits 58 and 59 and ejects coolant fluid from sealing element segments 49 and 50 through the discharge conduit 60. Likewise the pressurized air ejects coolant fluid from the transverse sealing element 54 through discharge conduit 61. The sealing elements thus cleared of coolant may be heated quickly without the heat retarding effect of the coolant that otherwise would remain in the sealing elements.

The packaging machine of the present invention may be provided either with a linear exit conveyor to eject completed bale packages from the end of the packaging machine or the packaging machine may be provided additionally with a transverse bale ejector mechanism capable of achieving side ejection of packaged bales. This feature allows continued production of bale packaging even though a receiving system such as a bale stacking machine may be incapable of handling the production rate of the packaging machine. While a side ejector is shown only on one side of the packaging machine, it is obvious that additional side ejector structures may be employed to eject package bales, selectively, from either side of the machine, as desired.

Since the packaging machine is geared for rapid packaging of bales being conveyed therethrough, the brake systems provided for the rolls of thermoplastic sheet material effectively prevent overrunning of the rolls which might otherwise allow the thermoplastic sheets to interfere with movement of successive bales into sealing position.

In view of the foregoing, it is apparent that I have provided a novel packaging machine for bales of tacky polymer or the like, that is capable of producing a loosely wrapped package and immediately ejecting the finished package from the machine. The packaging machine of my invention is also capable of selectively ejecting completed packages in linear or transverse manner as desired. Production of completed packages is enhanced by tubular sealing elements that are heated and are cooled by a liquid coolant to facilitate a rapid sealing cycle. The sealing cycle is also enhanced by the employment of a gas such as air that is ejected into the tubular sealing element to displace coolant therefrom and thereby shorten the subsequent heating cycle of the sealing element.

The packaging machine of my invention utilizes automatically timed heating and cooling cycles responsive to the presence, within the machine, of a bale or other article to be packaged. The machine is therefore adapted to provide optimum sealing even though the flow of articles to be packaged may be irregular. It is, therefore, seen that this invention is one well adapted to attain all the objects and advantages hereinabove set forth, together with other advantages which will become obvious and inherent from a description of the apparatus itself. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof, it is to be understood that all matters hereinabove set forth or shown in the accompanying drawing are to be interpreted as illustrative and not in a limiting sense.

Having thus illustrated and described my invention, I claim:

1. A packaging machine for loosely packaging a manufactured article in an envelope composed of thermoplastic material, said packaging machine wherein the improvement comprises:
    a framework defining a sealing station;
    said framework having means for supplying sheets of thermoplastic material, said sheets being joined at the extremities thereof by heat responsive fusion;
    first conveying means being supported by said framework and being operative to convey an article to be packaged into engagement with said sheets of thermoplastic material and to further convey said article until said sheets are positioned above and below said article;
    opposed backing and sealing means carried by said framework adjacent said sealing station and being movable one relative to the other into compressive engagement with said sheets of thermoplastic material about an article positioned at said sealing station;
    said heat sealing means being heated by electrical resistance;
    means for injecting a coolant fluid into said heat sealing means for selectively cooling the same;
    means for injecting a gas into said heat sealing means for selectively ejecting said coolant fluid from said heat sealing means prior to each heating cycle of said sealing means; and
    second conveying means being supported by said framework and being operative to eject a completed package from said packaging machine.

2. A packaging machine as recited in claim 1, wherein:
    said means for supplying spaced sheets of thermoplastic material being rolls of continuous webs of thermoplastic material being rotatably supported by said framework;
    said sheets of thermoplastic material being withdrawn from said rolls by an article being conveyed to said heat sealing station; and
    means for severing a sealed package from said continuous webs of thermoplastic material simultaneously with seaing of said package.

3. A packaging machine as recited in claim 2, wherein:
said means for severing a sealed package from said continuous webs of thermoplastic material comprises an element heated by electrical resistance; and
said heated element being moved into cutting engagement with said webs of thermoplastic material on the upstream side of said package substantially simultaneously with sealing of said package.

4. A packaging machine as recited in claim 2:
said sealing means having a generally "U"-shaped tubular electrical resistance energized heating element for sealing two sides and the upstream end of a package disposed at said sealing station;
said sealing means having a generally transverse tubular electrical resistance heating element for sealing the downstream end of a succeeding package substantially simultaneously with sealing the sides and upstream end of said package; and
said means for severing being an electrical resistance heated element moving into severing engagement with said webs of thermoplastic material between the upstream end of a package at said sealing station and the downstream end of a succeeding package.

5. A packaging machine as recited in claim 1:
said backing means comprising a backing frame having backing surface means disposed for engagement with said sheets of thermoplastic material;
means supporting said backing frame and being operative to move said backing surface means into engagement with said sheets of thermoplastic material;
said sealing means comprising a sealing frame; and
electrical resistance heating element means carried by said sealing frame and disposed for compressive engagement of said sheets of thermoplastic material against said backing surface means.

6. A packaging machine as recited in claim 5, wherein said sealing element means comprises:
a tubular electrical resistance energized heating element of generally "U"-shaped configuration for sealing two sides and the upstream end of a package disposed at said sealing station;
a transverse tubular electrical resistance energized heating element for sealing the downstream end of a succeeding package substantially with sealing the sides and upstream end of said package; and
an electrical resistance energized heating element carried by said sealing frame and being moved into severing engagement with said sheets of thermoplastic material between the upstream end of said package and the downstream end of a succeeding package simultaneously with sealing of said package.

7. A packaging machine as recited in claim 2:
brake means being carried by said framework and being operative to allow free rotation of said rolls during part of the packaging cycle and to retard rotation of said rolls during the remaining portion of said packaging cycle, said brake means comprising a brake disc being provided for each of said rolls, fluid motor means being disposed adjacent said discs and having brake shoes disposed in juxtaposed relation with said discs, and compressed gas means for energizing said fluid motor means and causing said brake shoes to retard rotation of said discs.

8. A packaging machine as recited in claim 2:
means supplying a jet of compressed gas and directing the same to impinge upon said sheets of thermoplastic material and causing movement of said sheets toward said sealing station.

9. A packaging machine for loosely packaging a manufactured article in an envelope composed of thermoplastic material, said packaging machine comprising:
a framework defining a sealing station;
at least two rolls of thermoplastic sheet material being rotatably supported by said framework, said sheet material being at least in part withdrawn from said rolls by an article being conveyed to said sealing station and being joined by heat induced fusion;
first conveyor means being supported by said framework and being operative to convey a bale of tacky polymer into engagement with said sheets of thermoplastic material;
a backing frame being carried by said framework and having backing surface means defined thereon being disposed for support of said sheets of thermoplastic material;
a sealing frame being supported by said framework and having a generally transverse tubular electrical resistance energized heat sealing element for sealing the downstream end of a succeeding package substantially with sealing the sides and upstream end of said package;
means for injecting a coolant fluid into said heat sealing element for selectively cooling the same;
means for injecting a gas into said heat sealing element for selectively ejecting said coolant fluid therefrom; and
second conveying means being supported by said framework and being operative to eject a completed package from said packaging machine immediately following said sealing and severing operation.

10. A packaging machine as recited in claim 9, wherein said sealing element means comprises:
a tubular electrical resistance energized heating element of generally "U"-shaped configuration for sealing two sides and the upstream end of a package disposed at said sealing station;
a transverse tubular electrical resistance energized heating element for sealing the downstream end of a succeeding package substantially simultaneously with sealing the sides and upstream end of said package; and
an electrical resistance energized heating element carried by said sealing frame and being moved into severing engagement with said sheets of thermoplastic material between the upstream end of said package and the downstream end of a succeeding package.

11. A method of machine operation for manufacturing packages from adjacent sheets of thermoplastic material supplied by rolls supported by the machine within which packages are disposed articles to be protected by said packages, said method comprising the steps of:
activating a powered conveyor of said machine and conveying an article between sheets of thermoplastic material extending from said rolls;

moving said sheets of thermoplastic material with said article disposed therebetween, intermediate a backing means and a heating means;

bringing said heating means and said backing means into compressive engagement with said sheets of thermoplastic material in spaced relation about the article thereby compressing said sheets together about said article;

energizing said heating means to cause fusion of said thermoplastic material;

injecting a coolant fluid into said heating means to cause cooling of said heating means and said fused thermoplastic material;

moving said heating means and said backing means apart to release said compressive engagement thereof with said sheets of thermoplastic material; and injecting a gas into said heating element to displace said coolant fluid therefrom.

12. A method according to claim 11 and including the method step of:

severing said sheets of thermoplastic material to complete said package substantially simultaneously with energizing said heat sealing element.

13. A method according to claim 11 and including the method step of:

severing said sheets of thermoplastic material subsequent to energizing said heat sealing element.

* * * * *